(12) United States Patent
Shao et al.

(10) Patent No.: US 11,847,361 B2
(45) Date of Patent: Dec. 19, 2023

(54) IMAGE FORMING CONTROL METHOD, DEVICE, APPARATUS, SYSTEM, AND STORAGE MEDIUM

(71) Applicant: Zhuhai Pantum Electronics Co., Ltd., Zhuhai (CN)

(72) Inventors: Zhe Shao, Zhuhai (CN); Shiyan Li, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 17/849,872

(22) Filed: Jun. 27, 2022

(65) Prior Publication Data
US 2023/0004335 A1 Jan. 5, 2023

(30) Foreign Application Priority Data
Jul. 1, 2021 (CN) .......................... 202110741992.3

(51) Int. Cl.
*G06F 3/12* (2006.01)

(52) U.S. Cl.
CPC .......... *G06F 3/1212* (2013.01); *G06F 3/1229* (2013.01); *G06F 3/1236* (2013.01); *G06F 3/1257* (2013.01); *G06F 3/1273* (2013.01)

(58) Field of Classification Search
CPC .... G06F 3/1212; G06F 3/1229; G06F 3/1236; G06F 3/1257; G06F 3/1273; G06F 3/1245; G06F 3/1208; G06F 3/1204; G06F 3/1253; H04N 1/52
See application file for complete search history.

(56) References Cited

U.S. PATENT DOCUMENTS

| | | | |
|---|---|---|---|
| 2007/0071471 | A1 | 3/2007 | Itagaki |
| 2015/0023683 | A1* | 1/2015 | Akimoto ............... G06F 3/1247 399/75 |
| 2017/0208184 | A1* | 7/2017 | Toriyabe ............ H04N 1/00204 |
| 2017/0359472 | A1* | 12/2017 | Kaneko ................ G06F 3/1268 |
| 2018/0332193 | A1* | 11/2018 | Tsuchiya ............... G06F 3/1206 |

FOREIGN PATENT DOCUMENTS

| | | |
|---|---|---|
| CN | 1790178 A | 6/2006 |
| CN | 101431588 A | 5/2009 |
| EP | 3125522 A1 | 2/2017 |
| JP | 2021049687 A | 4/2021 |
| WO | WO-2021021165 A1 * | 2/2021 ........... G06F 3/1208 |

* cited by examiner

*Primary Examiner* — John R Wallace
(74) *Attorney, Agent, or Firm* — ANOVA LAW GROUP, PLLC

(57) ABSTRACT

An image forming control method is applied to an image forming apparatus. The method includes, after the image forming apparatus is connected to an image processing apparatus, sending information related to a halftone parameter of the image forming apparatus to the image processing apparatus for storage, obtaining halftone-processed intermediate data that is to be printed sent by the image processing apparatus, and outputting the halftone-processed intermediate data that is to be printed to an image generator to perform an image forming operation.

11 Claims, 9 Drawing Sheets

IMAGE FORMING CONTROL METHOD, DEVICE, APPARATUS, SYSTEM, AND STORAGE MEDIUM

CROSS-REFERENCE TO RELATED APPLICATION

This application claims priority to Chinese Application No. 202110741992.3, filed Jul. 1, 2021, the entire content of which is incorporated herein by reference.

TECHNICAL FIELD

The present disclosure generally relates to the image forming technology field and, more particularly, to an image forming control method, device, apparatus, system, and storage medium.

BACKGROUND

A color graphical device interface (GDI) printer cannot directly process document content provided by a computer. Thus, the computer needs to process the document content. In the existing technology, the computer has a set of halftone characteristic parameters and performs same processing on all printers. However, since the printers have different physical characteristics, image quality and color accuracy may be reduced.

Generally, after the GDI printer is connected to the computer, the GDI printer sends halftone characteristic parameters of the GDI printer to the computer. The computer processes content that is to be printed according to the halftone characteristic parameters sent by the GDI printer to ensure the quality and color accuracy of the printed content.

Print control may be performed using the above solution. If a user has sent a printing job through the computer when the computer is not connected to the GDI printer, the computer needs to wait after the computer is connected to the GDI printer to process the content that is to be processed according to the halftone characteristic parameters sent by the GDI printer. As such, printing time of a first page may be increased, and user experience is not high.

SUMMARY

Embodiments of the present disclosure provide an image forming control method applied to an image forming apparatus. The method includes, after the image forming apparatus is connected to an image processing apparatus, sending information related to a halftone parameter of the image forming apparatus to the image processing apparatus for storage, obtaining halftone-processed intermediate data that is to be printed sent by the image processing apparatus, and outputting the halftone-processed intermediate data that is to be printed to an image generator to perform an image forming operation.

Embodiments of the present disclosure provide an image forming control method applied to an image processing apparatus. The method includes, before the image processing apparatus is connected to a target image forming apparatus, obtaining information related to a historical halftone parameter, and performing halftone processing on intermediate data that is to be printed according to the information related to the historical halftone parameter. The information related to the historical halftone parameter includes information related to a halftone parameter sent after the image processing apparatus is connected to the target image forming apparatus a previous time. The method further includes, after the image processing apparatus is connected to the target image forming apparatus, obtaining and saving information related to the halftone parameter sent by the target image forming apparatus this time and sending halftone-processed intermediate data that is to be printed to the target image forming apparatus to perform an image forming operation.

Embodiments of the present disclosure provide an image forming control device based on an image forming apparatus, including a processor and a memory. The memory stores an instruction that, when executed by the processor, causes the processor to, after the image forming apparatus is connected to an image processing apparatus, send information related to a halftone parameter of the image forming apparatus to the image processing apparatus for storage, obtain halftone-processed intermediate data that is to be printed sent by the image processing apparatus, and output the halftone-processed intermediate data that is to be printed to an image generator to perform an image forming operation.

Through the above technical solution, the image processing apparatus can save the information related to the halftone parameter sent by the image forming apparatus. When the image processing apparatus is not connected to the image forming apparatus and the user has sent a printing job through the image processing apparatus, the image processing apparatus may perform the halftone processing on the intermediate data that is to be printed according to the saved information related to the historical halftone parameter. After being connected to the image forming apparatus, the image processing apparatus may send the halftone-processed intermediate data that is to be printed to the target image forming apparatus to perform the image forming operation. After the image processing apparatus is connected to the image forming apparatus, the image processing apparatus may also obtain and save the information related to the halftone parameter sent by the target image forming apparatus this time. The image processing apparatus may also use the information related to the halftone parameter sent by the target image forming apparatus this time as the information related to the historical halftone parameter for use the next time when the image processing apparatus is not connected to the image forming apparatus and the user has sent a printing job through the image processing apparatus. Thus, the output time of the first page of the image forming apparatus may not be increased while the printing quality is ensured.

DETAILED DESCRIPTION OF THE EMBODIMENTS

In order to make the purposes, technical solutions, and advantages of embodiments of the present disclosure clearer, the technical solutions of embodiments of the present disclosure are described in detail below in connection with the accompanying drawings of embodiments of the present disclosure. Apparently, the described embodiments are some embodiments of the present disclosure, but not all embodiments. Based on embodiments of the present disclosure, all other embodiments obtained by those of ordinary skill in the art without creative efforts shall be within the scope of the present disclosure.

Figure 1:
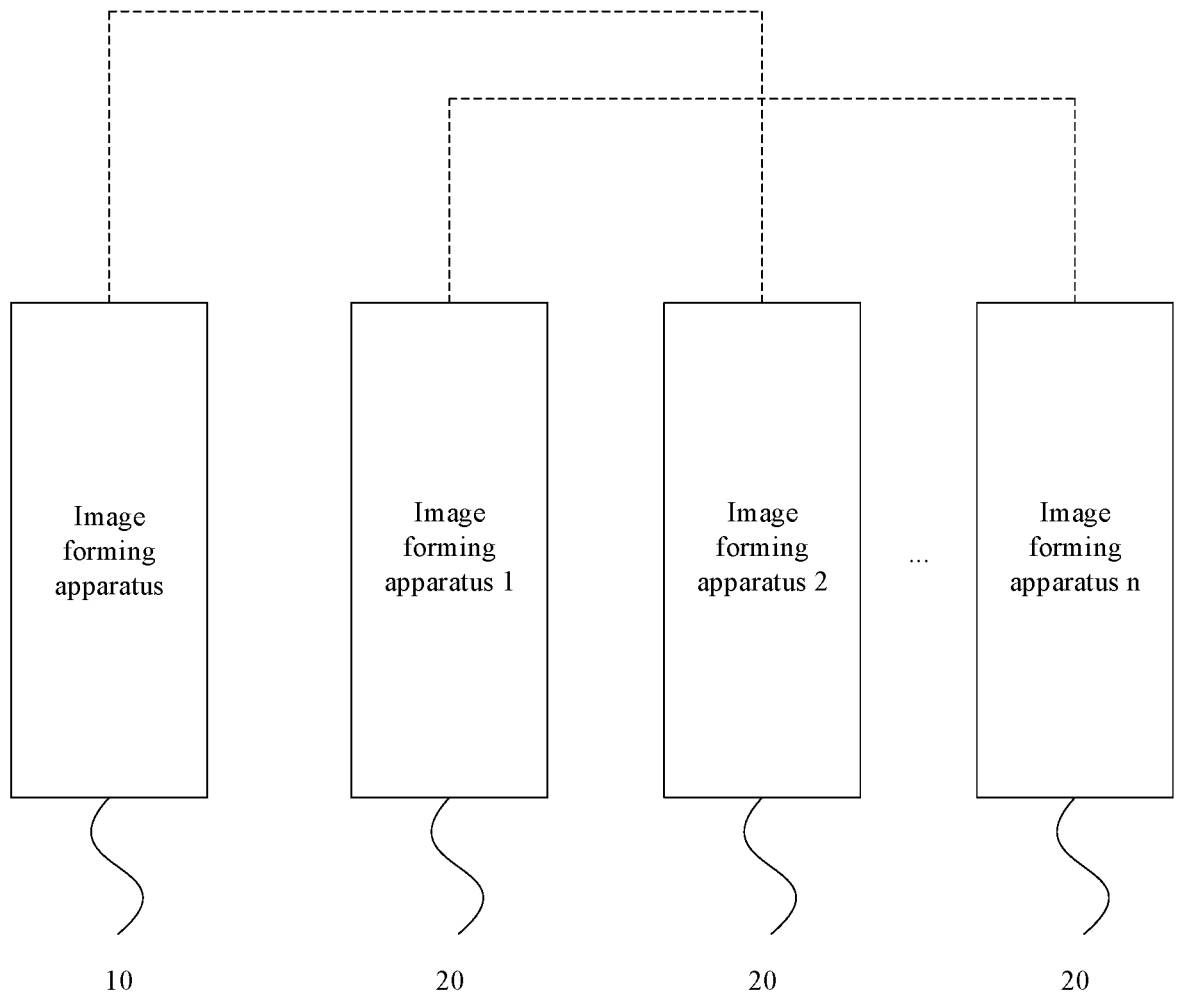
FIG. 1 is a schematic diagram of an image forming control scene according to some embodiments of the present disclosure.

FIG. 1 is a schematic diagram of an image forming control scene according to some embodiments of the present disclosure. As shown in FIG. 1, an application scene of an image forming control method of embodiments of the present disclosure includes an image forming apparatus 10 and an image processing apparatus 20. One image forming apparatus 10 may be connected to a plurality of image processing apparatuses 20. Different image forming apparatuses 10 may be connected to the same image processing apparatus 20. In some embodiments, the image processing apparatus may include a desktop computer, a laptop computer, a tablet computer, a cell phone, a personal digital assistant (PDA), and another terminal apparatus that has a function of sending a printing job. The image forming apparatus may be a printer, or may be another apparatus for image printing, graphic copying, laser coding, or medical images. When the image processing apparatus is not connected to the image forming apparatus, and the user has sent a printing job through the image processing apparatus, the image processing apparatus may perform halftone processing on intermediate data that is to be printed without halftone processing according to saved information related to a historical halftone parameter. After the image processing apparatus is connected to the image forming apparatus, the halftone-processed intermediate data that is to be printed may be sent to the target image forming apparatus to perform an image forming operation. The information related to the halftone parameter may include a compensation parameter used to calibrate a standard halftone parameter in the image processing apparatus (halftone characteristic parameters of the graphical device interface (GDI) printer) or a compensated halftone parameter. After the image processing apparatus is connected to the image forming apparatus, the halftone parameter or compensation parameter sent by the target image forming apparatus this time may be obtained and saved. The halftone parameter or compensation parameter may be used as a historical halftone parameter or historical compensation parameter for the next use. The intermediate data without halftone processing may refer to image data of an 0-255 grayscale, into which the image processing apparatus system converts a document before the halftone processing after the user issues a command. First intermediate data may refer to image data after the halftone processing is performed using the historical halftone parameter stored by the image processing apparatus. Second intermediate data may refer to image data after the halftone processing is performed using the halftone parameter sent to the image processing apparatus by the image forming apparatus this time.

Figure 2:
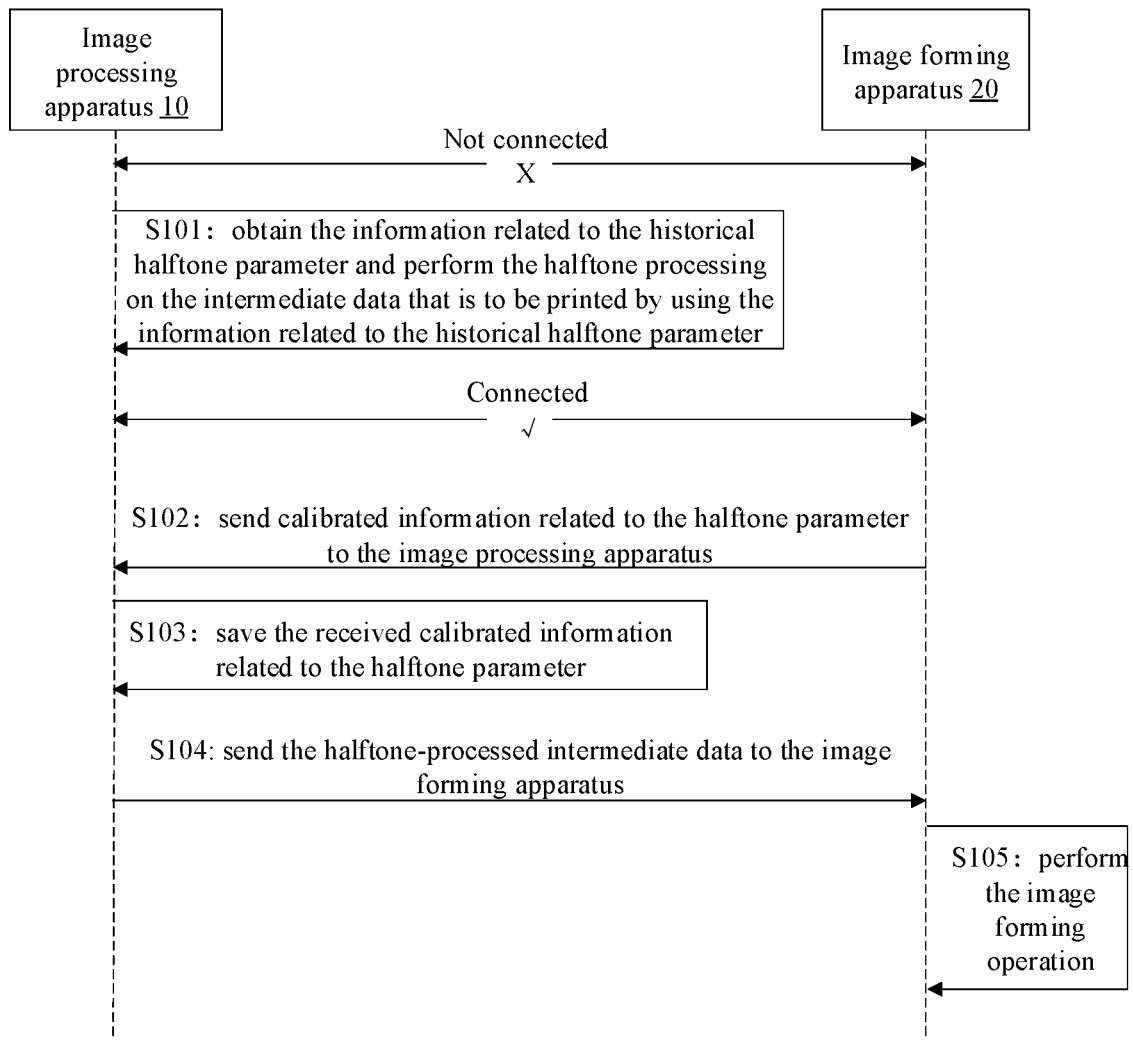
FIG. 2 is a schematic flowchart of an image forming control method according to some embodiments of the present disclosure.

FIG. 2 is a schematic flowchart of an image forming control method according to some embodiments of the present disclosure. As shown in FIG. 2, the method includes the following processes.

At 101, the information related to the historical halftone parameter is obtained, and the halftone processing is performed on the intermediate data that is to be printed by using the information related to the historical halftone parameter.

At 102, after the image processing apparatus 10 is connected to the target image forming apparatus 20, the target image forming apparatus 20 sends the calibrated information related to the halftone parameter to the image processing apparatus 10.

At 103, the image processing apparatus 10 receives and saves the calibrated information related to the halftone parameter sent by the target image forming apparatus 20.

At 104, after the image processing apparatus 10 is connected to the target image forming apparatus 20, the image processing apparatus 10 sends the halftone-processed intermediate data that is to be printed to the target image forming apparatus 20.

At 105, the target image forming apparatus 20 performs a corresponding image forming operation after receiving the halftone-processed intermediate data that is to be printed.

Figure 3:
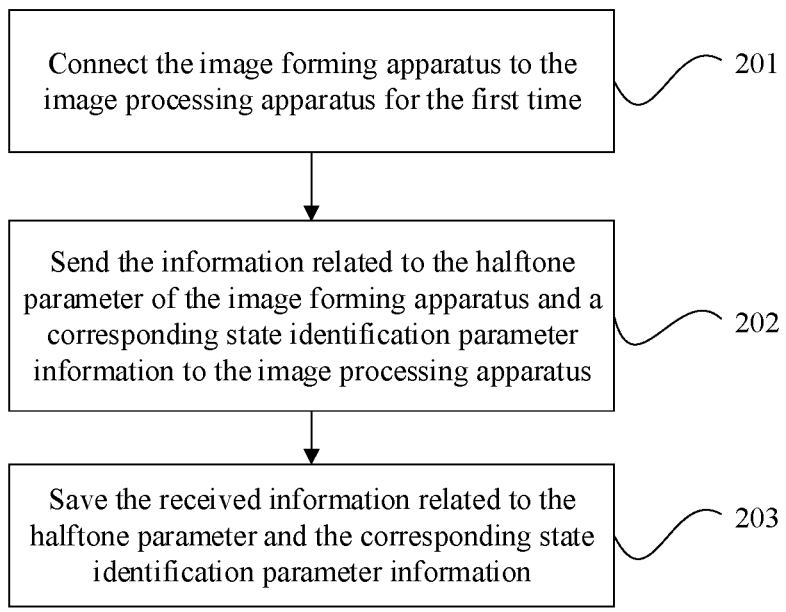
FIG. 3 is a schematic diagram of saving information related to a halftone parameter during a first connection according to some embodiments of the present disclosure.

Before process 101, the image processing apparatus 10 may obtain the information related to the halftone parameter of the image forming apparatus 20. In some embodiments, FIG. 3 is a schematic diagram of saving the information related to the halftone parameter during a first connection according to some embodiments of the present disclosure. As shown in FIG. 3, a storage operation of the information related to the halftone parameter during the first connection includes the following processes.

At 201, the image forming apparatus 20 is connected to the image processing apparatus 10 for the first time.

At 202, the image forming apparatus 20 sends the information related to the halftone parameter of the image forming apparatus 20 and a corresponding state identification parameter information to the image processing apparatus 10.

At 203, the image processing apparatus 10 saves the received information related to the halftone parameter and the corresponding state identification parameter information.

In some embodiments, in processes 201 to 203, after the image forming apparatus 20 is connected to the image processing apparatus 10 for the first time, the information related to the halftone parameter and the corresponding state identification parameter information of the image forming apparatus 20 may be sent to the image processing apparatus 10 for storage. The state identification parameter information may include one or more of state parameters. The state parameter may include at least one of generation time of the information related to the halftone parameter, an ambient temperature and humidity of the apparatus, a lifetime state of a toner cartridge, or an accumulated image forming page number of the apparatus. The state identification parameter information may be used to identify the information related to the halftone parameter corresponding to different states of each printer of a same type. The state identification parameter may also include another parameter except for the state parameter, e.g., a count of a number of times of updating the information related to the halftone parameter. In some embodiments, the identification parameter of the image forming apparatus and the information related to the halftone parameter may be sent to the image processing apparatus to be saved correspondently. The identification parameter may include a serial number of the image forming apparatus, firmware version data, and/or toner cartridge chip identification number.

In some embodiments, the image processing apparatus 10 may locally save the received information related to the halftone parameter and the corresponding state identification parameter information.

In some embodiments, in process 101, when the image processing apparatus 10 (such as a computer) is not connected to the target image forming apparatus 20 (such as a printer), and the user sends a printing job through the image processing apparatus 10, the image processing apparatus 10 may convert the target content that is to be printed into initial intermediate data and save the initial intermediate data. Further, the image processing apparatus 10 may obtain information related to the historical halftone parameter of the target image forming apparatus 20, and perform halftone processing on the initial intermediate data according to the information related to the historical halftone parameter of the target image forming apparatus 20 to obtain and save the first intermediate data.

In some embodiments, if the image processing apparatus 10 locally stores the information related to the historical halftone parameter of the target image forming apparatus 20, the halftone processing may be performed on the initial intermediate data by directly calling the locally saved information related to the historical halftone parameter of the target image forming apparatus 20 to obtain and save the first intermediate data.

In some other embodiments, if the information related to the historical halftone parameter of the target image forming apparatus 20 is saved in an external storage apparatus of the image processing apparatus 10, the information related to the historical halftone parameter of the target image forming apparatus 20 may be obtained from the external storage apparatus, and the halftone processing may be performed on the initial intermediate data to obtain and save the first intermediate data.

In some embodiments, in process 102, after the image processing apparatus 10 is connected to the target image forming apparatus 20, the target image forming apparatus 20 may send the calibrated information related to the halftone parameter to the image processing apparatus 10. In some embodiments, the target image forming apparatus 20 may calibrate the information related to the historical halftone parameter through the state parameter corresponding to the target image forming apparatus 20 to obtain the calibrated information related to the halftone parameter. The information related to the historical halftone parameter that needs to be calibrated may include the information related to the halftone parameter sent by the target image forming apparatus 20 when the target image forming apparatus 20 is connected to the image processing apparatus 10 last time. Image processing apparatuses 10 of neighboring two connections may not be the same image processing apparatus 10. After the calibration operation, the target image forming apparatus 20 may send the calibrated information related to the halftone parameter to the image processing apparatus 10.

In some embodiments, in process 103, after receiving the calibrated information related to the halftone parameter sent by the target image forming apparatus 20, the image processing apparatus 10 may save the calibrated information related to the halftone parameter to a corresponding storage unit (local or external storage unit). In some embodiments, the calibrated information related to the historical halftone parameter that is received this time may replace the originally saved information related to the halftone parameter. That is, the calibrated information related to the historical halftone parameter that is received this time may replace the information related to the halftone parameter that is sent by the target image forming apparatus 20 last time.

In some embodiments, in process 104, after the image processing apparatus 10 is connected to the target image forming apparatus 20, the image processing apparatus 10 may send the first intermediate data obtained in process 101 to the target image forming apparatus 20.

A sequence of processes 102 and 104 is not limited during execution. In some embodiments, after the image processing apparatus 10 is connected to the target image forming apparatus 20, processes 102 and 104 may be controlled to be processed simultaneously.

In some embodiments, in process 105, after receiving the halftone-processed intermediate data that is to be printed (first intermediate data), the target image forming apparatus 20 may send the first intermediate data to the image generator of the target image forming apparatus 20 to perform a corresponding image forming operation (such as a printing operation).

The technical solution corresponding to the image forming control method of embodiments shown in FIG. 2 is described above. In the technical solution, the target image forming apparatus 20 (such as a printer) may be connected to the image processing apparatus 10 (such as a computer). The user may send a printing job through image processing apparatus 10. In such a scenario, the halftone processing may be performed on the corresponding intermediate data that is to be printed based on the saved information related to the historical halftone parameter. Then, the halftone-processed intermediate data (first intermediate data) may be sent to the target image forming apparatus 20 to perform the corresponding image forming operation (such as the printing operation) to obtain a corresponding image file (such as a printed file). Thus, the problem of increasing the printing time of the first page of a file may be solved.

In some application scenarios, an interval time between two neighboring connections between the image processing apparatus 10 and the target image forming apparatus 20 may be longer than a first time threshold (for example, one week). Then, the information related to the halftone parameter sent by the target image forming apparatus 20 when the target image forming apparatus 20 was connected to the image processing apparatus 10 last time may not be applicable for the target image forming apparatus 20 in a current state. That is, if the image processing apparatus 10 performs the processing on the intermediate data that is to be printed according to the saved information related to the historical halftone parameter of the target image forming apparatus 20, the image quality may be degraded.

Based on solving the problem of increasing the printing time of the first page of a file, in order to further solve the problem that the image quality is degraded due to the interval time between the two neighboring connections being longer than the first time threshold, embodiments of the present disclosure provide another image forming control method.

Figure 4:
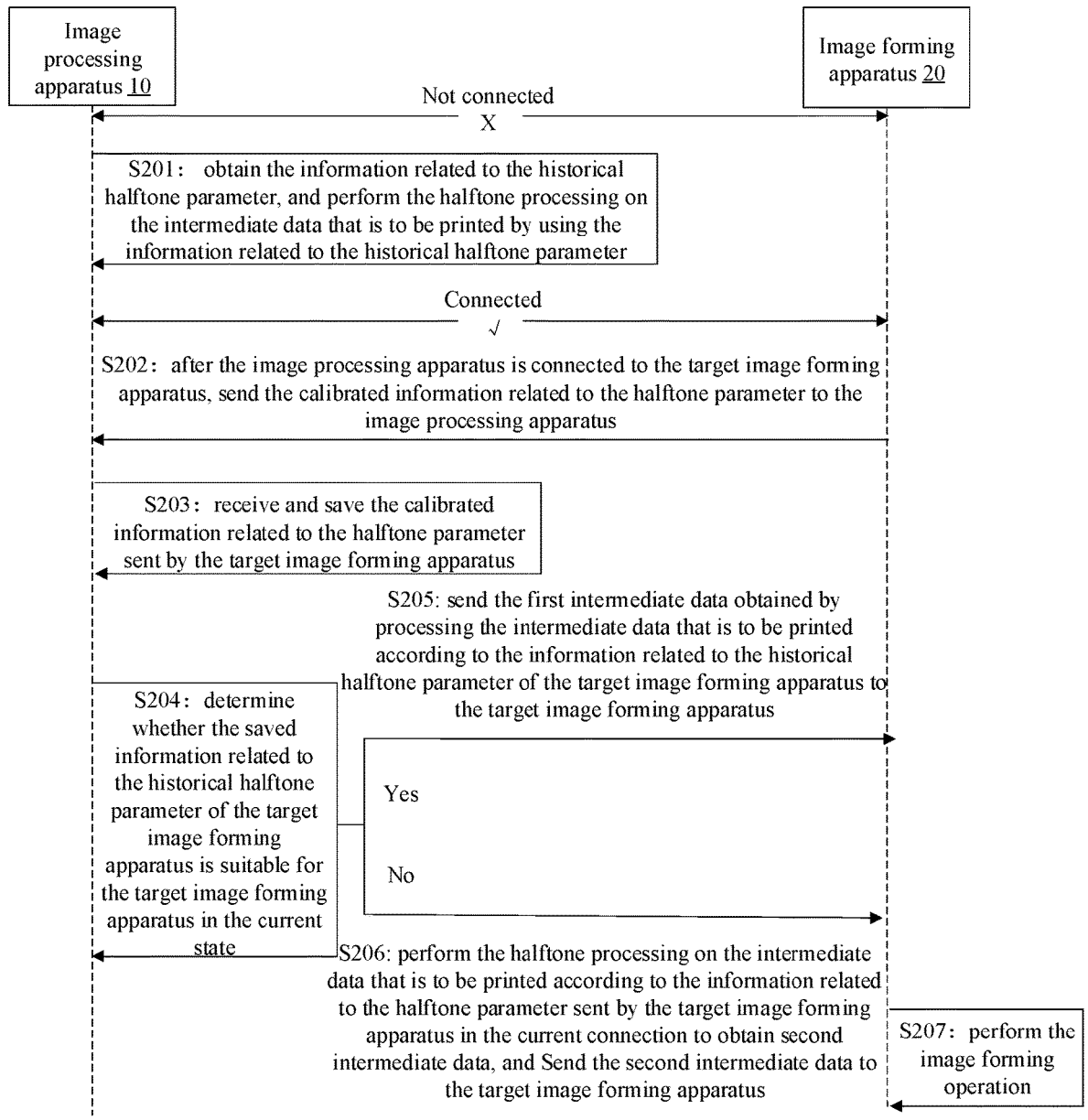
FIG. 4 is a schematic flowchart of an image forming control method according to some embodiments of the present disclosure.

FIG. 4 is a schematic flowchart of the image forming control method according to some embodiments of the present disclosure. As shown in FIG. 4, the method includes the following processes.

At 201, the information related to the historical halftone parameter is obtained, and the halftone processing is performed on the intermediate data that is to be printed by using the information related to the historical halftone parameter.

At 202, after the image processing apparatus 10 is connected to the target image forming apparatus 20, the target image forming apparatus 20 sends the calibrated information related to the halftone parameter to the image processing apparatus 10.

At 203, the image processing apparatus 10 receives and saves the calibrated information related to the halftone parameter sent by the target image forming apparatus 20.

At 204, whether the saved information related to the historical halftone parameter of the target image forming apparatus 20 is applicable to the target image forming apparatus 20 in the current state is determined. If the saved information related to the historical halftone parameter is applicable for the target image forming apparatus 20 in the current state, process 205 is performed. If the saved information related to the historical halftone parameter is not applicable to the target image forming apparatus 20 in the current state, process 206 is performed.

At 205, the first intermediate data obtained by processing the intermediate data that is to be printed according to the information related to the historical halftone parameter of the target image forming apparatus 20 is sent to the target image forming apparatus 20.

At 206, the halftone processing is performed on the intermediate data that is to be printed according to the information related to the halftone parameter sent by the target image forming apparatus 20 in the current connection to obtain second intermediate data, and the second intermediate data is sent to the target image forming apparatus 20.

Implementations of processes 201 to 203 may be same as or similar to implementations of processes 101 to 103 of embodiments shown in FIG. 2, which is not repeated here. A different operation may include that, each time after the image processing apparatus 10 is connected to the target image forming apparatus 20, the target image forming apparatus 20 also sends the calibrated state identification parameter information corresponding to the information related to the halftone parameter to the image processing apparatus 10, and the image processing apparatus 10 receives and saves the state identification parameter information.

In some embodiments, in process 204, the image processing apparatus 10 is connected to the target image forming apparatus 20 and obtains the calibrated information related to the halftone parameter sent by the target image forming apparatus 20 this time. Then, whether a difference between the state identification parameter information sent by the target image forming apparatus 20 this time and the historical state identification parameter information (e.g., the state identification parameter information sent by the target image forming apparatus 20 when the target image forming apparatus 20 was connected to the image processing apparatus 10 last time) is within a first range may be determined. If the difference is within the first range, the information related to the historical halftone parameter may be determined to be applicable to the target image forming apparatus 20 in the current state. If the difference exceeds the first range, the information related to the historical halftone parameter may be determined to be not applicable to the target image forming apparatus 20 in the current state.

In some embodiments, determining whether the difference between the state identification parameter information sent by the target image forming apparatus 20 this time and the historical state identification parameter information is within the first range may include determining whether an interval time between generation time of the information related to the historical halftone parameter and generation time of the information related to the halftone parameter received this time exceeds one week. If the interval time does not exceed one week, the information related to the historical halftone parameter may be determined to be applicable to the target image forming apparatus 20 in the current state. If the interval time has exceeded one week, the information related to the historical halftone parameter may be determined to be not applicable to the target image forming apparatus 20 in the current state.

In some other embodiments, determining whether the difference between the state identification parameter information sent by the target image forming apparatus 20 this time and the historical state identification parameter information is within the first range may include determining whether the interval time between the generation time of the information related to the historical halftone parameter and the generation time of the information related to the halftone parameter received this time is more than one week, and determining whether a difference between a temperature and humidity value of the target image forming apparatus 20 when the information related to the historical halftone parameter is generated and a temperature and humidity value of the target image forming apparatus 20 when the information related to the halftone parameter that is received this time is generated exceeds a temperature and humidity threshold. If any one of the factors exceeds a corresponding threshold, the information related to the historical halftone parameter may be determined to be not applicable to the target image forming apparatus 20 in the current state. If all the factors do not exceed the corresponding thresholds, the information related to the historical halftone parameter may be determined to be applicable to the target image forming apparatus 20 in the current state.

Determining whether the difference between the state identification parameter information sent by the target image forming apparatus 20 this time and the historical state identification parameter information is within the first range is not limited to the above embodiments. One or more factors in the state identification parameter information may be selected according to the user needs as a determination factor to determine whether the difference between the state identification parameter information sent this time and the historical state identification parameter information is within the first range. The selected determination factor may be compared to the corresponding threshold to determine whether the difference between the state identification parameter information sent this time and the historical state identification parameter information is within the first range.

The implementation of process 205 may be same as or similar to the implementation of process 104 in embodiments shown in FIG. 2, which is not repeated here.

In some embodiments, in process 206, after the information related to the historical halftone parameter is determined to be not applicable to the target image forming apparatus 20 in the current state, the halftone processing may be performed on the intermediate data that is to be printed according to the information related to the halftone parameter sent by the target image forming apparatus 20 this time to obtain the second intermediate data. The second intermediate data may be sent to the target image forming apparatus 20 to ensure the quality of the printed image.

The implementation of process 207 may be same as or similar to the implementation of process 105 in embodiments shown in FIG. 2, which is not repeated here.

The image forming control method of embodiments shown in FIG. 4 is described in detail below by taking a GDI printer and a computer as an example.

Figure 5:
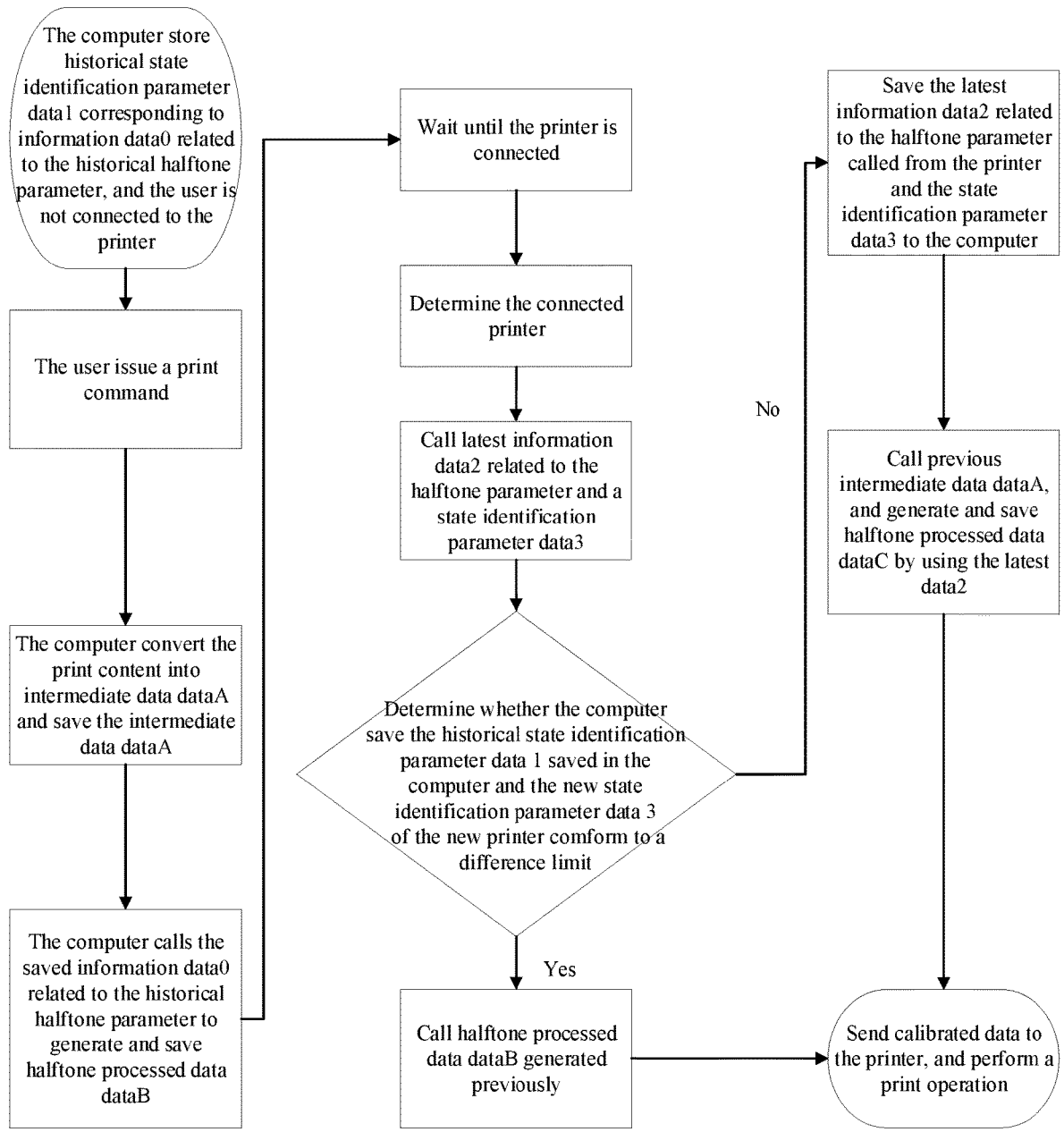
FIG. 5 is a schematic flowchart of image forming control according to some embodiments of the present disclosure.

As shown in FIG. 5, a scenario includes a GDI printer and a computer. The computer has saved information data0 related to the historical halftone parameter of the target GDI printer and corresponding historical state identification parameter information data1. The computer is currently not connected to the GDI printer.

When the computer is not connected to the GDI printer, after the user sends a print command through the computer, the computer may convert a print content into intermediate data data-A and save intermediate data data-A. The computer may perform the halftone processing on intermediate data data-A by using saved information data0 related to historical halftone parameter to obtain and save halftone-processed intermediate data data-B.

After the computer is connected to the GDI printer, the computer may obtain latest information data2 related to the halftone parameter sent by the printer (the calibrated information related to the halftone parameter) and corresponding state identification parameter information data3. Further, whether the difference between historical state identification parameter information data1 saved in the computer and latest sent state identification parameter information data3 conforms to a difference limit (i.d., whether the difference is within the first range) may be determined. If the difference between historical state identification parameter information data1 saved in the computer and latest sent state identification parameter information data3 conforms to the difference limit, generated intermediate data data-B may be called and sent to the printer to perform a printing operation. If the difference between historical state identification parameter information data1 saved in the computer and latest sent state identification parameter information data3 does not conform to the difference limit, the halftone processing may be performed on intermediate data data-A that is to be printed by calling latest sent information data2 related to the halftone parameter to obtain halftone-processed intermediate data data-C. Intermediate data data-C may be sent to the printer to perform a printing operation.

Figure 6:
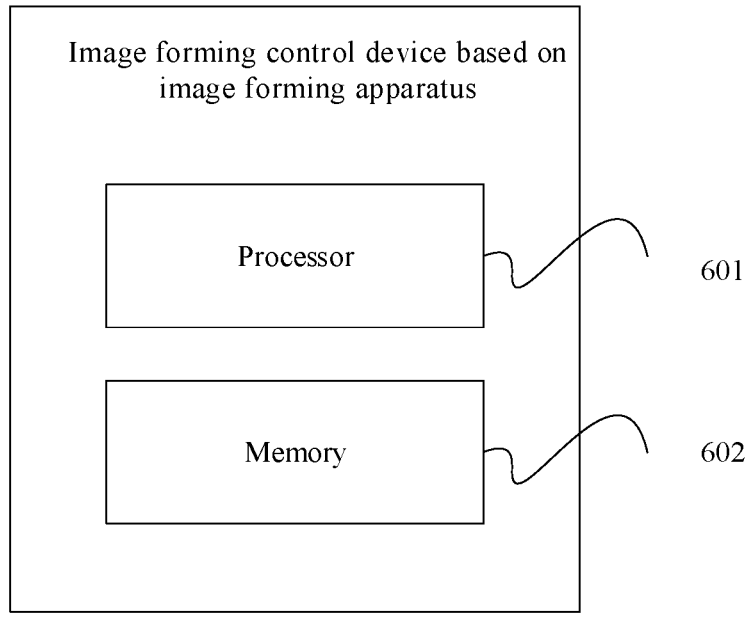
FIG. 6 is a schematic structural diagram showing an image forming control device based on an image forming apparatus according to some embodiments of the present disclosure.

Embodiments of the present disclosure further provide an image forming control device based on an image forming apparatus. As shown in FIG. 6, the device includes a processor 601 and a memory 602. The memory 602 is used to store at least one instruction that, when the instruction is executed by the processor 601, causes the processor 601 to perform the image forming control method of embodiments shown in FIG. 2 or the image forming control method of embodiments shown in FIG. 4.

Figure 7:
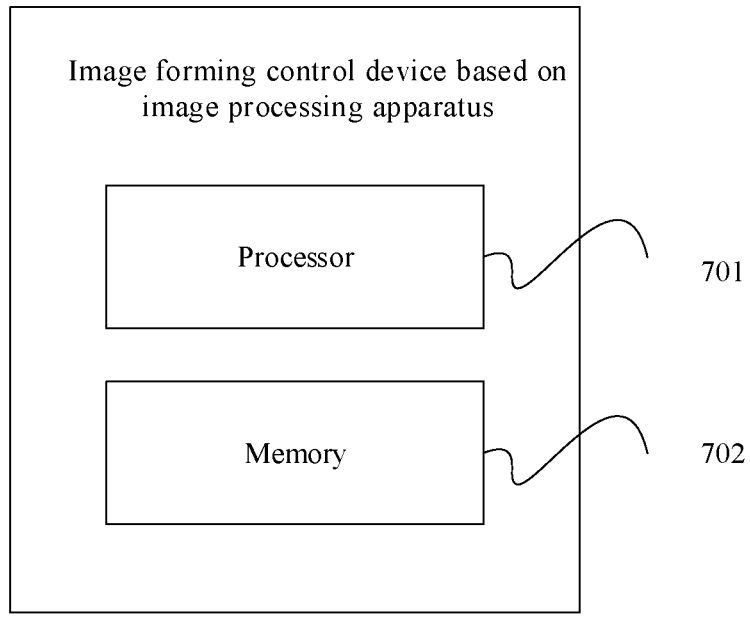
FIG. 7 is a schematic structural diagram showing an image forming control device based on an image processing apparatus according to some embodiments of the present disclosure.

Embodiments of the present disclosure further provide an image forming control device based on an image processing apparatus. As shown in FIG. 7, the device includes a processor 701 and a memory 702. The memory 702 is used to store at least one instruction that, when the instruction is executed by the processor 701, causes the processor 701 to perform the image forming control method of embodiments shown in FIG. 2 or the image forming control method of embodiments shown in FIG. 4.

Figure 8:
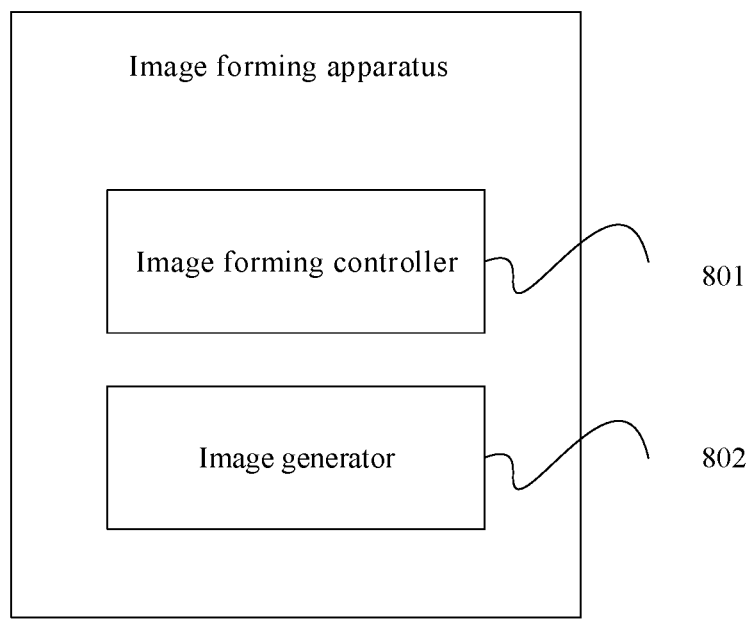
FIG. 8 is a schematic structural diagram of an image forming control apparatus according to some embodiments of the present disclosure.

Embodiments of the present disclosure further provide an image forming apparatus 20. As shown in FIG. 8, the apparatus includes an image forming controller 801 and an image generator 802. The image forming controller 801 includes the image forming control device based on the image forming apparatus shown in FIG. 6.

Embodiments of the present disclosure further provide an image forming system. The system may include an image processing apparatus 10 and an image forming apparatus 20 shown in FIG. 8. In some embodiments, the image processing apparatus 10 and the image forming apparatus 20 may form a scenario as shown in FIG. 1, which is not limited to the scenario shown in FIG. 1.

Figure 9:
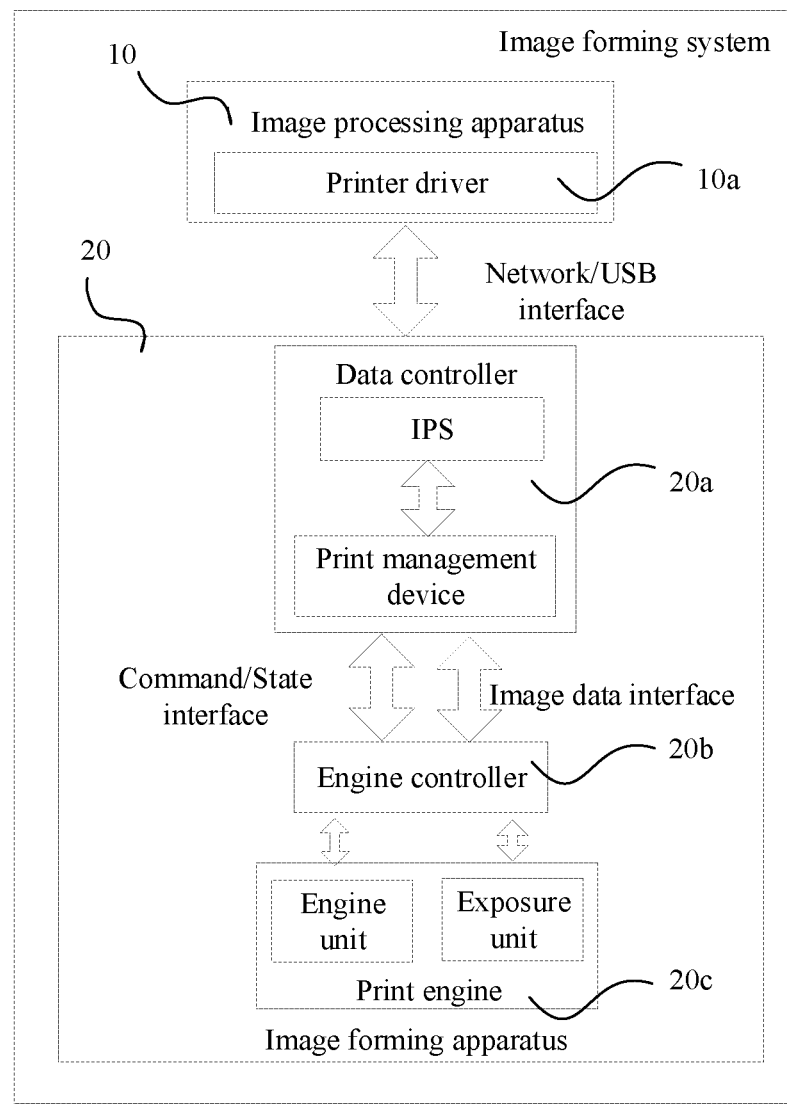
FIG. 9 is a schematic connection diagram showing an image forming control system according to some embodiments of the present disclosure.

The connection between the image processing apparatus 10 and the image forming apparatus 20 in the image forming system may be as shown in FIG. 9. In some embodiments, the image processing apparatus 10 may be installed with a printer driver 10*a*. The image forming apparatus 20 may include a data controller 20*a*, an engine controller 20*b*, and a print engine 20*c*.

In embodiments of the present disclosure, the image forming system shown in FIG. 9 is configured to perform the image forming control method shown in FIG. 2 or the image forming control method shown in FIG. 4. The halftone processing may include converting a grayscale image into a binary image. The halftone parameter may refer to a signal of an image on a transfer belt collected by an image density control (IDC) sensor. The sensor signal may be converted into a color density of a corresponding level through an algorithm. The color density may be mapped into a tone curve of 0-255, applied to color conversion of an image process system (IPS), and saved.

During printing, an image forming command may be initiated by the computer. The printer driver on the computer side may perform processing on an electronic document according to a user setting to generate an image forming task data stream. Then, the printer driver may send the image forming task data stream to the image forming apparatus via a network/USB interface. To obtain the image forming task data stream, at this time, the image forming apparatus may receive the image forming task data stream from the computer. During copying, the image forming task may be initiated by the image forming apparatus. For example, the user may trigger the image forming task through a panel, a touch screen, or a key of the image forming apparatus. The image forming apparatus may scan an original copy according to the user setting and generate an image forming task data stream. Thus, to obtain the image forming task data stream, the image forming apparatus may generate the image forming task data stream.

The image forming task data stream may include an image forming task start, a single/double-sided imaging identification, a page task data stream, and an image forming task end. The page task data stream may include a page start, an engine control parameter, image data, and a page end. The engine control parameter may include a print color (black and white or colored), a page size, a paper type, a single-sided and double-sided setting, a binding setting, etc. The image forming task end may include a specific task end identifier. The binding setting may be used to indicate whether binding is required for the image forming task.

A main body of the image forming apparatus may receive the image forming task data stream sent from the computer from via the network or the USB interface or generate the image forming task data stream after scanning the original copy according to the user setting. The IPS may parse the image forming task data stream according to the received information (e.g., tone curve) generated by the halftone parameter. The image forming task start and the page start of each page, the image data, the page end of each page, and the engine control parameter pared by the IPS may be sent to a print management device. The halftone parameter may influence the color conversion of the image data parsed by IPS, for example, tone adjustment.

The print management device may save single-sided/double-sided print imaging information represented by the single-sided/double-sided imaging identifier and start to create a task page according to the single-sided/double-sided imaging identifier. The print management device may send the data of the created task page to the engine controller. The image data of each page may be sent via the image data interface. The engine control parameter of each page may be sent via the command state interface.

Figure 10:
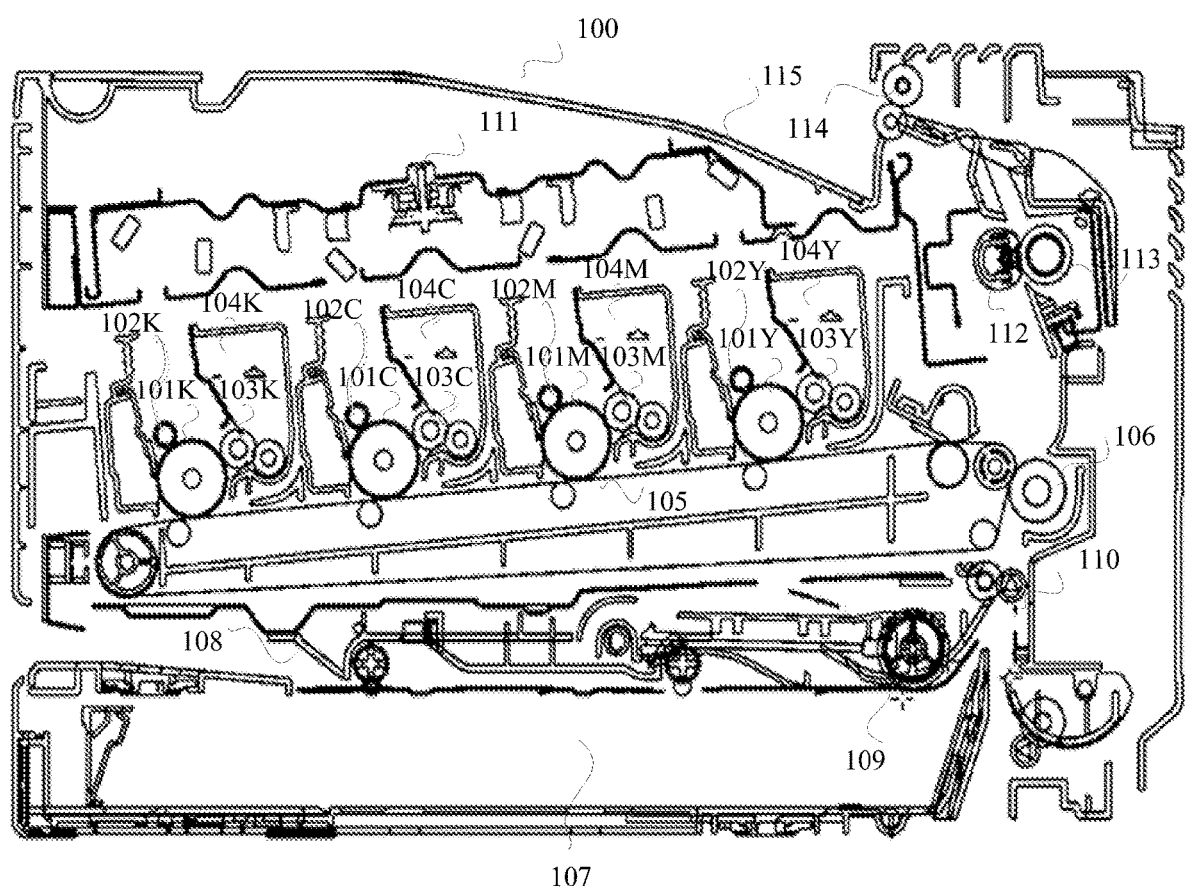
FIG. 10 is a schematic structural diagram of an image forming control apparatus according to some embodiments of the present disclosure.

FIG. 10 is a schematic structural diagram of an image forming apparatus according to some embodiments of the present disclosure. As shown in FIG. 10, the image forming apparatus 100 includes four process cartridges (Y, M, C, K), a transfer belt 105, a secondary transfer roller 106, an enter paper cassette 107, a manual feed tray 108, a paper feed roller 109, a convey roller 110, a laser scan unit (LSU) 111, a heat roller 112, a press roller 113, a discharge roller 114, and a discharge cassette 115. The 4 process cartridges (Y, M, C, K) may correspond to 4 print colors, respectively. A specific structure of the four process cartridges may include photosensitive drums 101Y-K, charging rollers 102Y-K, developing rollers 103Y-K, and toner cartridges 104Y-K configured to accommodate the toners of the respective colors. As shown in FIG. 1, LSU 111 includes a single LSU, which includes four beam paths. The four charging rollers 102Y-K may be configured to charge the surfaces of the four photosensitive drums 101Y-K, respectively. Laser beams may be emitted from the four beam paths of the LSU 111, respectively, to form electrostatic latent images on the surfaces of the photosensitive drums 101Y-K. The four developing rollers 103Y-K may be configured to develop toner images of the colors on the surfaces of the photosensitive drums 101Y-K, respectively. The image forming apparatus 100 may adopt a secondary transfer method. That is, the four photosensitive drums 101Y-K may sequentially transfer the toner images to the transfer belt 105. Then, the color toner images formed on the transfer belt 105 may be secondarily transferred on the paper through the secondary transfer roller 106. The enter paper cassette 107 may store paper. The paper feed roller 109 may convey the stored paper to a convey path. The convey roller 110 may convey the paper on the convey path to the secondary transfer roller 106 for transfer image forming. The secondary transfer roller 106 may convey the imaged paper to a nip area between the heat roller 112 and the press roller 113. The heat roller 112 and the press roller 113 may be configured to form the toner image on the paper. The heat roller 112 may adopt a ceramic heating method. The heat roller 112 and the press roller 113 may convey the paper with the formed image to the discharge roller 114. The discharge roller 114 may discharge the paper to the discharge paper cassette 115 and stack the paper. As such, image printing may be completed. The image forming apparatus (device) may include but is not limited to a printer, a copy machine, a fax machine, a scanner, and an all-in-one machine that integrates functions such as printing, copying, faxing, scanning, etc. The image forming apparatus may be configured to print image or text on an imaging medium.

Embodiments of the present disclosure further provide a computer-readable storage medium. The computer-readable storage medium may store a computer program that, when executed by a processor, causes the processor to perform the image forming control method shown in FIG. 2 or the image forming control method shown in FIG. 4.

Terminals involved in embodiments of the present disclosure may include, but are not limited to, a personal computer (PC), a personal digital assistant (PDA), a wireless handheld apparatus, a tablet computer, a cellphone, an MP3 player, an MP4 player, etc.

The application may include an application program (nativeApp) installed on the terminal or a web page program (webApp) of a browser on the terminal, which is not limited here.

Those skilled in the art may clearly understand that, for the convenience and brevity of the description, specific operation processes of the system, device, and unit described above may refer to corresponding processes of method embodiments, which is not repeated here.

In embodiments of the present disclosure, the disclosed system, apparatus, and method may be implemented in another manner. For example, the apparatus embodiments described above are only illustrative. For example, the division of the units is only a logical functional division and may have another division method in an actual implementation. For example, a plurality of units or components may be combined or integrated into another system, or some features may be omitted or not implemented. On the other hand, the shown or discussed mutual coupling, direct coupling, or communication connection may be through some interfaces and indirect coupling or communication connection of devices or units, and may be electrical, mechanical, or in another form.

The units described as separate components may or may not be physically separated. The components displayed as units may or may not be physical units. That is, the components may be located in one place or distributed to a plurality of network units. Some or all of the units may be selected according to actual needs to achieve the purpose of the solution of embodiments of the present disclosure.

In addition, functional units of embodiments of the present disclosure may be integrated into one processing unit, or each of the functional units may exist physically alone. In some embodiments, two or more functional units may be integrated into one unit. The integrated units may be implemented in a form of hardware or in a form of hardware plus software functional units.

The integrated unit implemented in the form of software functional units may be stored in a computer-readable storage medium. The software functional units may be stored in a storage medium, which includes several instructions used to cause a computer device (e.g., a personal computer, a server, or a network device) or a processor to perform some processes of the methods of embodiments of the present disclosure. The storage medium may include an U disk, a mobile hard disk, a read-only memory (ROM), a random access memory (RAM), a magnetic disk or an optical disk, and another medium that can store program codes.

The above are some embodiments of the present disclosure and are not intended to limit the present disclosure. Any modification, equivalent replacement, and improvement made within the spirit and principle of the present disclosure shall be within the scope of the present disclosure.

Embodiments of the present disclosure are only used to illustrate the technical solutions of the present disclosure, but not to limit the present disclosure. Although the present invention has been described in detail with reference to the embodiments above, those of ordinary skill in the art should understand that modifications may still be made to the technical solutions described in the embodiments above, or equivalent replacements may still be made to some or all of the technical features. These modifications or replacements do not make the essence of the corresponding technical solutions depart from the scope of technical solutions of embodiments of the present disclosure.

What is claimed is:

1. An image forming control method, applied to an image forming apparatus, comprising:
   in a first connection to an image processing apparatus, sending a halftone parameter to the image processing apparatus to be saved by the image processing apparatus as a historical halftone parameter; and
   in a second connection to image processing apparatus, the second connection being later in time than the first connection, sending calibration information to the image processing apparatus to calibrate the historical halftone parameter to form calibrated historical halftone parameter for storage by the image processing apparatus,
   wherein the image processing apparatus obtains a first state identification parameter of the image processing apparatus in the first connection and a second state identification parameter of the image processing apparatus in the second connection, determines whether a difference between the first and the second state identification parameters is within a first range, and in response to the difference being within the first range, determines the historical halftone parameter applicable to the image forming apparatus, and in response to the difference exceeding the first range, determines the historical halftone parameter not applicable to the image forming apparatus.

2. The method of claim 1, further comprising:
   obtaining a state parameter of the image forming apparatus,
   wherein the state parameter includes at least one of a generation time of information on the historical halftone parameter, an ambient temperature and humidity of the image forming apparatus, a lifetime state of a toner cartridge, or an accumulated image forming page number of the image forming apparatus.

3. The method of claim 2, further comprising:
   sending the state parameter to the image processing apparatus.

4. The method of claim 1, further comprising:
   sending an identification parameter of the image forming apparatus to the image processing apparatus for storage.

5. An image forming control method, applied to an image processing apparatus, comprising:
   in a first connection to an image forming apparatus, obtaining from the image processing forming apparatus a halftone parameter and saving the halftone parameter as a historical halftone parameter;
   in a second connection to the image forming apparatus, the second connection being later in time than the first connection, obtaining and saving calibration information related to the halftone parameter from the image forming apparatus to calibrate the historical halftone parameter to form calibrated historical halftone parameter;
   obtaining a first state identification parameter of the image processing apparatus in the first connection and a second state identification parameter of the image processing apparatus in the second connection, and determining whether a difference between the first and the second state identification parameters is within a first range; and
   in response to the difference being within the first range, determining the historical halftone parameter applicable to the image forming apparatus, and in response to the difference exceeding the first range, determining the historical halftone parameter not applicable to the image forming apparatus.

6. The method of claim 5, further comprising:
   obtaining state identification parameter sent by the image forming apparatus; and
   determining whether the historical halftone parameter is applicable to the image forming apparatus according to the state identification parameter.

7. The method of claim 6, wherein the state identification parameter includes at least one of a generation time of information on the historical halftone parameter, ambient temperature and humidity of the target image forming apparatus, a lifetime state of a toner cartridge, or an accumulated image forming page number of the target image forming apparatus.

8. An image forming control device based on an image forming apparatus, comprising: a processor; and a memory storing an instruction that, when executed by the processor, causes the processor to:
   in a first connection to an image processing apparatus, send a halftone parameter to the image processing apparatus to be saved by the image processing apparatus as a historical halftone parameter;
   in a second connection to the image processing apparatus, the second connection being later in time than the first connection, send calibration information to the image processing apparatus to calibrate the historical halftone parameter to form calibrated historical halftone parameter for storage by the image processing apparatus,
   wherein the image processing apparatus obtains a first state identification parameter of the image processing apparatus in the first connection and a second state identification parameter of the image processing apparatus in the second connection, determines whether a difference between the first and the second state identification parameters is within a first range, and in response to the difference being within the first range, determines the historical halftone parameter applicable to the image forming apparatus, and in response to the difference exceeding the first range, determines the historical halftone parameter not applicable to the image forming apparatus.

9. The device of claim 8, wherein the processor is further caused to:
   obtain a state parameter of the image forming apparatus, wherein the state parameter includes at least one of a generation time of information on the historical halftone parameter, an ambient temperature and humidity of the image forming apparatus, a lifetime state of a toner cartridge, or an accumulated image forming page number of the image forming apparatus.

10. The device of claim 9, wherein the processor is further caused to:
    send the state parameter to the image processing apparatus.

11. The device of claim 8, wherein the processor is further caused to:

send an identification parameter of the image forming apparatus to the image processing apparatus for storage.

\* \* \* \* \*